Patented Dec. 28, 1948

2,457,642

UNITED STATES PATENT OFFICE 2,457,642

METHOD OF TREATING LACTALBUMIN

George P. Butterfield, Des Plaines, and Lois A. Thorne, Chicago, Ill., assignors to American Seal-Kap Corporation of Delaware, Wilmington, Del., a corporation of Delaware No Drawing. Application April 8, 1946, Serial No. 660,424

2 Claims. (Cl. 99—19)

This invention relates to a method of treating lactalbumin to render the same colloidal in form so that when mixed with water or other liquids it forms a permanent suspension.

Lactalbumin is present in milk in a colloidal state, but during the process of separating and extracting the lactalbumin from milk whey it becomes clotted and is thus made incapable of forming a true colloidal mixture when again added to water or other liquids. Instead it will readily separate on standing even for a short time, making its administration to humans difficult and also making its incorporation into other products difficult.

It is an object of this invention to reconvert lactalbumin into a colloidal form suited to make a permanent suspension when mixed with a liquid.

Another object is to provide lactalbumin in dry or concentrated form which is capable of being converted into a permanent suspension resembling milk by the addition of water thereto.

Another object is to provide lactalbumin in a form which may be kept for long periods of time without deterioration.

Various other objects and advantages will be apparent as the nature of the invention is more fully disclosed.

In accordance with the present invention, we have found that separated lactalbumin can be rendered colloidal or capable of forming a permanent colloidal suspension by a brief, controlled treatment with proteolytic enzymic material such as pancreatic enzymes or papain. The treatment must be controlled as to concentration, temperature and time in the manner to be described so as to loosen the bonds or linkages within the molecules without digesting the lactalbumin. The resulting product may be kept in its liquid or semi-liquid state, preserving of course with satisfactory methods, or may be dehydrated. The dehydrated material is easily packed and stored, is easy to incorporate in compounds and can be easily reconstituted to liquid or semi-liquid colloidal state by the addition of water.

Briefly, the treatment involves mixing a dried or wet lactalbumin with water, adjusting the pH by addition of a suitable alkali to an alkaline state not exceeding a pH of 8.0, nor less than 7.3, adding pancreatic enzyme material while holding the lactalbumin-water mixture at a temperature at which the enzymes are active and then inactivation of the enzymes by heating to a temperature of about 145° F. and holding there for a period of 30 minutes.

Although the novel features which are characteristic of this invention are pointed out more particularly in the claims appended hereto, the nature of the invention will be better understood by referring to the following description in which a specific embodiment has been set forth for purposes of illustration.

In carrying out the present process to lactalbumin, which contains a great deal of water as removed from whey or to a dried lactalbumin, is added additional water so that in either case a lactalbumin-water mixture with solids of about 5 to 15 per cent is obtained. The lactalbumin in water is then further intimately mixed in a suitable colloid mill to form a smooth easy flowing mixture. The pH value is adjusted with sodium carbonate and/or sodium hydroxide to a pH of 7.3 to 8.0. The temperature is then brought to 100° F. and pancreatic enzyme material is added in the order of from 1 part enzyme material to 40 parts lactalbumin solids to 1 part enzyme material to 1000 parts lactalbumin solids. The temperature is brought gradually to 148° F. over a 20 minute period and held there for a period of 30 minutes. Throughout the treatment the mixture is stirred at a moderately fast rate. It is then possible to (1) immediately spray dry; (2) evaporate and freeze; (3) evaporate and can the solubilized product. One can readily see that there are possible a number of variations in the handling of this treatment, such as more enzyme and shorter time, longer periods of time and lower temperature, so that the treatment may be handled by different modes and slightly different techniques to best suit the operation and the timing of this operation with further processing.

It is important to so control the treatment as not to substantially digest the lactalbumin, but to attack the protein molecule only slightly with the enzyme treatment so as to loosen the bonds or linkages within the molecules and to produce colloidal conditions in the lactalbumin.

In the above process pancreatic enzyme material containing trypsin and having a proteolytic activity of 1 to 40 is used. Proteolytic enzyme material of any known standard can be used, varying the ratio of enzyme to lactalbumin in accordance with the potency of the enzyme material. The ratio of enzyme material to lactalbumin solids may vary with the time of treatment according to the following examples which show also the manner of adjusting for enzyme material of different potency:

| Enzyme:Lactalbumin Ratio | | Time of Activity |
|---|---|---|
| 1:40 Enzyme | 1:250 Enzyme | |
| 1:40 | 1:250 | Minutes 1-5 |
| 1:100 | 1:625 | 10 |
| 1:500 | 1:3125 | 15 |
| 1:1000 | 1:6250 | 20 |

The time and temperature must be selected to avoid substantial digestion of the proteins while permitting the activity to cause a loosening of the bonds of the molecules. It is assumed in the above examples that the temperature is raised from 100° F. to 145° F. in the time specified.

When spray-drying the treated lactalbumin as in a spray drier, the temperature of the drying chamber should not exceed 200° F. in order to avoid affecting the taste of the product. When the lactalbumin is treated as above, it may be stored for long periods of time and when again mixed with water for use is found to be similar in taste to fresh lactalbumin.

Although certain specific examples have been given by way of illustration, it is to be understood that various changes and modifications may be made therein and that the scope of the invention is only to be restricted in accordance with the following claims.

What is claimed is:

1. The method of treating lactalbumin to condition the same to form a colloidal suspension, which comprises making a finely divided mixture of lactalbumin and water, raising the pH value to from 7.3 to 8.0, adding a proteolytic enzyme material selected from the group consisting of pancreatic enzymes and papain while maintaining a temperature of about 100° F. and increasing the temperature to a value to inactivate the enzymes in a time of from 1 minute to 20 minutes, depending upon the strength and proportion of the enzyme material to allow the active material to break down the bonds of the protein molecules and render the same colloidal, but before substantial digestion of the proteins has occurred, and drying the material to form a dry powder which may be kept for long periods of time and which can be reconstituted in a colloidal suspension by the addition of water thereto.

2. The method of treating lactalbumin to condition the same to form a colloidal suspension, which comprises making a finely divided mixture of lactalbumin and water, raising the pH value to from 7.3 to 8.0, adding a proteolytic enzyme material selected from the group consisting of pancreatic enzymes and papain while maintaining a temperature of about 100° F. and increasing the temperature to a value to inactivate the enzymes in a time to allow the active material to break down the bonds of the protein molecules and render the same colloidal, but before substantial digestion of the protein has occurred, holding at inactivation temperature for thirty minutes, and spray-drying the material in a zone maintained below 200° F. to form a dry powder which may be kept for long periods of time and which can be reconstituted in a colloidal suspension by the addition of water thereto.

GEORGE P. BUTTERFIELD.
LOIS A. THORNE.

REFERENCES CITED

The following references are of record in the file of this patent:

UNITED STATES PATENTS

| Number | Name | Date |
|---|---|---|
| 1,218,190 | Kummerlander | Mar. 6, 1917 |
| 1,754,825 | Heuser | Apr. 15, 1930 |
| 2,006,699 | Supples et al. | July 2, 1935 |
| 2,115,505 | Conquest | Apr. 26, 1938 |
| 2,353,946 | Storrs | July 18, 1944 |
| 2,381,407 | Levinson et al. | Aug. 7, 1945 |
| 2,391,559 | Faulkner | Dec. 25, 1945 |